United States Patent
Cozzo et al.

(10) Patent No.: US 7,751,467 B2
(45) Date of Patent: Jul. 6, 2010

(54) METHOD AND APPARATUS FOR SELECTING SIGNAL PROCESSING DELAYS BASED ON HISTORICAL SELECTION DATA

(75) Inventors: Carmela Cozzo, Cary, NC (US); Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 813 days.

(21) Appl. No.: 11/566,256

(22) Filed: Dec. 4, 2006

(65) Prior Publication Data

US 2008/0130797 A1    Jun. 5, 2008

(51) Int. Cl.
    *H04B 1/00*    (2006.01)
(52) U.S. Cl. ........................... 375/150; 375/136
(58) Field of Classification Search ................ 375/136, 375/142–144, 147–150
    See application file for complete search history.

(56) References Cited

U.S. PATENT DOCUMENTS

| | | | |
|---|---|---|---|
| 5,654,979 A * | 8/1997 | Levin et al. ................. 375/142 |
| 5,680,143 A * | 10/1997 | Hershey et al. ............. 342/375 |
| 6,275,483 B1 | 8/2001 | Papasakellariou et al. |
| 6,377,615 B1 * | 4/2002 | Sourour et al. .............. 375/150 |
| 6,683,924 B1 | 1/2004 | Ottosson et al. |
| 6,914,932 B1 * | 7/2005 | Miya et al. .................. 375/150 |
| 6,922,434 B2 | 7/2005 | Wang et al. |
| 2001/0028677 A1 | 10/2001 | Wang et al. |
| 2001/0043578 A1 | 11/2001 | Kumar et al. |
| 2002/0061056 A1 | 5/2002 | Smolyar et al. |
| 2003/0235238 A1 * | 12/2003 | Schelm et al. .............. 375/148 |
| 2004/0053592 A1 | 3/2004 | Reial |
| 2004/0063420 A1 | 4/2004 | Hayata |
| 2004/0066841 A1 * | 4/2004 | Jonsson ...................... 375/148 |
| 2004/0071193 A1 | 4/2004 | Atarashi et al. |
| 2004/0072553 A1 | 4/2004 | Wang et al. |
| 2004/0139466 A1 | 7/2004 | Sharma et al. |
| 2004/0203405 A1 | 10/2004 | Reial et al. |

(Continued)

FOREIGN PATENT DOCUMENTS

EP    1339172    8/2003

(Continued)

OTHER PUBLICATIONS

Bottomley, Gregory E. et al. "A Generalized RAKE Receiver for Interference Suppression." IEEE Journal on Selected Areas in Communications, Aug. 2000, pp. 1536-1545, vol. 18, No. 8.

(Continued)

*Primary Examiner*—Emmanuel Bayard
(74) *Attorney, Agent, or Firm*—Coats & Bennett, P.L.L.C.

(57) ABSTRACT

Signal processing delays are selected from a candidate set in a wireless receiver based on both present and past channel behavior. According to one embodiment, a subset of signal processing delays are selected for received signal processing by accumulating a history of periodic delay selection computations for a candidate set of signal processing delays during a time interval. The delay selection calculations are based on cross-correlations between different ones of the signal processing delays. At the end of the time interval, a subset of the signal processing delays are selected from the candidate set of delays for received signal processing based on the history of delay selection computations.

35 Claims, 7 Drawing Sheets

U.S. PATENT DOCUMENTS

| | | | |
|---|---|---|---|
| 2004/0214546 A1* | 10/2004 | Heinila | 455/256 |
| 2005/0007975 A1* | 1/2005 | Shen et al. | 370/320 |
| 2005/0047485 A1 | 3/2005 | Khayrallah et al. | |
| 2005/0078742 A1 | 4/2005 | Reial | |
| 2006/0120438 A1 | 6/2006 | Reial | |
| 2006/0182204 A1 | 8/2006 | Cairns et al. | |

FOREIGN PATENT DOCUMENTS

| | | |
|---|---|---|
| EP | 1482652 | 12/2004 |
| JP | 2006086632 | 3/2006 |
| WO | 02052743 A2 | 7/2002 |
| WO | WO 02/067453 | 8/2002 |
| WO | 04001983 A2 | 12/2003 |
| WO | WO 2004/107597 | 12/2004 |
| WO | 2006037593 A1 | 4/2006 |

OTHER PUBLICATIONS

Kim, Suk Won. "Smart Antennas at Handsets for the 3G Wideband CDMA Systems and Adaptive Low-Power RAKE Combining Schemes." Masters Thesis, Virginia Polytechnic Institute and State University, Blacksburg, VA, Jul. 2002.

Bejjani et al., "Adaptive Channel Delays Selection for WCDMA Mobile System," Vehicular Technology Conference, Sep. 19, 1999, pp. 203-207, vol. 1, XP-10352949.

* cited by examiner

METHOD AND APPARATUS FOR SELECTING SIGNAL PROCESSING DELAYS BASED ON HISTORICAL SELECTION DATA

BACKGROUND

The present invention generally relates to wireless communication, and particularly relates to selecting signal processing delays from a candidate set of delays.

Multipath fading is a signal propagation phenomenon that results in a transmitted radio signal reaching at least one receiving antenna via two or more paths. Each received signal component experiences different attenuation, delay and phase shift while traveling from the source to the receiver. RAKE receivers attempt to counter the effects of multipath fading by placing several "fingers" at different signal path delays in order to receive individual components of a multipath signal. Each signal component is processed independently, but at a later stage combined in order to utilize the different transmission characteristics of each transmission path.

RAKE receivers are so named because of their analogous function to a garden rake, each finger being placed at a signal path delay for collecting bit or symbol energy similarly to how tines on a rake collect leaves. RAKE receivers tend to provide optimal interference suppression when signal interference and noise is white. However, multipath fading causes correlated interference.

Generalized RAKE (G-RAKE) receivers improve upon RAKE receivers in that they account for interference correlation by modifying finger placement accordingly. Unlike RAKE receivers which only place fingers on signal path delays for maximizing signal energy collection, G-RAKE receivers place some fingers on signal path delays and others off signal path delays. Fingers placed on signal path delays optimize signal energy collection while those placed off-path suppress interference.

One conventional approach for identifying an optimal group of delays in G-RAKE receivers is channel probing where a candidate set of delays is monitored and a subset selected for signal combining. Because wireless channels vary over time, the optimal delays used for signal combining also change. G-RAKE receivers use various conventional channel probing techniques to estimate the time-varying behavior of wireless channels. However, each of these techniques selects a subset of delays from a candidate set based on calculations instantaneously made at the channel fading rate.

For example, a candidate set of N delays may be used to probe a channel of interest. The M best delays are instantaneously selected at the channel fading rate based on a selection criterion such as maximal combining weights or signal-to-interference-plus-noise ratios. As such, delays are placed in optimal positions based on a present understanding of the wireless channel. The selected delays are then used to combine various components of a received signal, thus optimizing signal energy reception while suppressing interference. However, selecting delays at the same rate at which a channel changes increases the complexity of the receiver.

SUMMARY

According to the methods, apparatus and computer program products taught herein, signal processing delays such as RAKE-based finger delays and chip equalizer filter tap locations are selected from a candidate set based on both past and present delay selection decisions. The selected subset of delays is used for received signal processing, e.g., weighting and combining various components of a baseband signal to yield soft symbol estimates or estimating received signal quality. Optionally, probing finger placement may be modified based on past and present delay selection decisions.

The delay selection process is based on a delay selection metric that is computed and accumulated over a period of time. The metric is periodically computed for each signal processing delay or groups of delays included in a candidate set. The metric is based on cross-correlations between different ones of the delays and indicates which candidate delays are suitable for selection at a particular point in time. The metric is accumulated after each computation. Delay selection is based on the cumulative metric, thus accounting for both present and past channel behavior. As such, delay selection is not based solely on the metric value most recently computed at the channel fading rate nor is it based solely on power density, thus reducing receiver complexity and improving performance.

According to one embodiment, a subset of signal processing delays are selected for received signal processing by accumulating a history of periodic delay selection computations for a candidate set of signal processing delays during a time interval. The delay selection calculations are based on cross-correlations between different ones of the signal processing delays. At the end of the time interval, a subset of the signal processing delays are selected from the candidate set of delays for received signal processing based on the history of delay selection computations.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
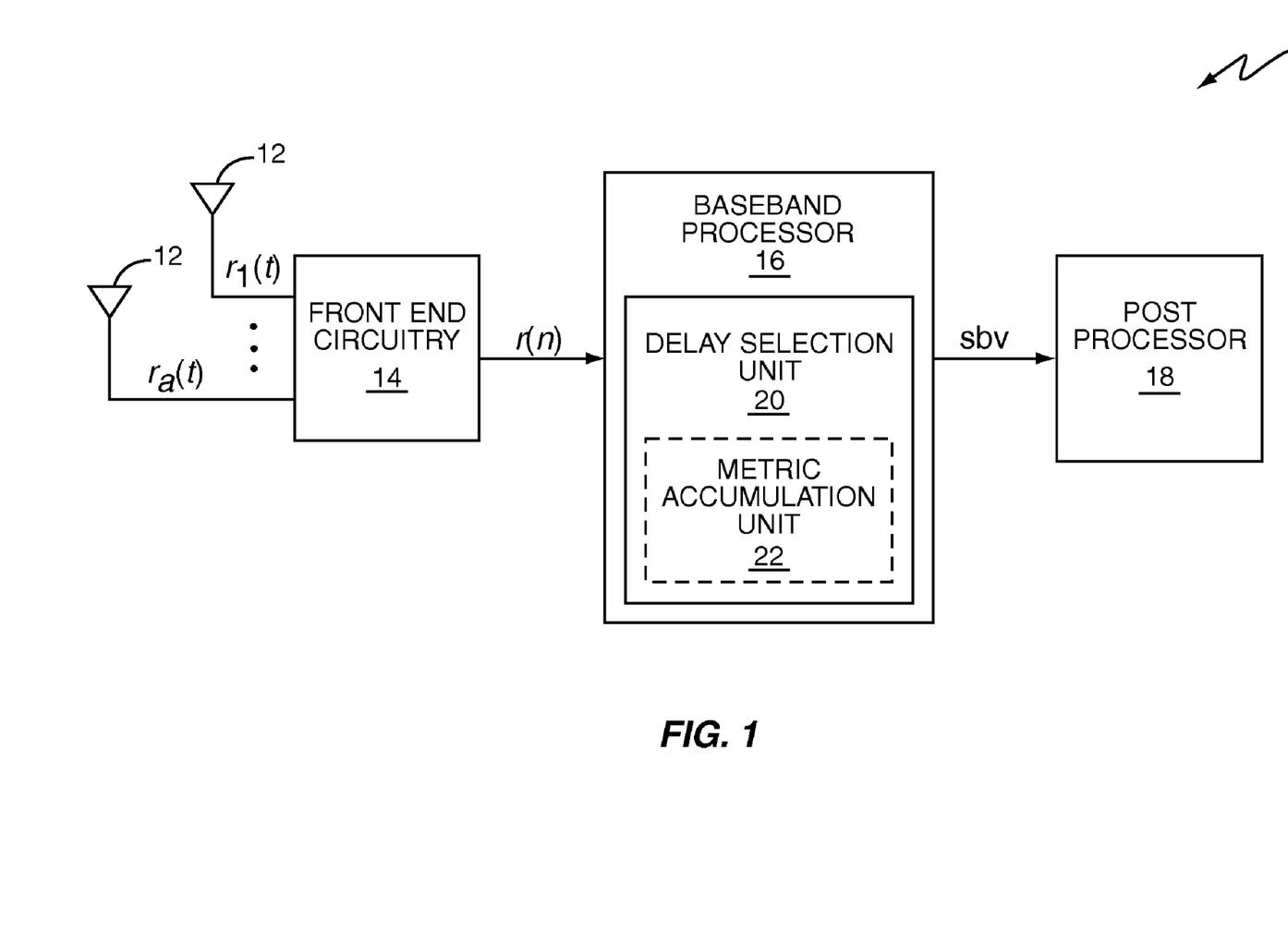
FIG. 1 is a block diagram of one embodiment of a wireless communication device including a baseband processor for selecting a subset of signal processing delays from a candidate set based on a cumulative metric.

FIG. 1 illustrates an embodiment of a wireless communication device 10 such as a mobile phone or a wireless Local Area Network (LAN) adapter. The device 10 processes signals transmitted in conformance with a Code Division Multiple Access (CDMA) multiplexing scheme such as Wideband CDMA (W-CDMA), Direct-Sequence CDMA (DS-CDMA), 1xEV-DO, etc. The device 10 comprises one or more antennas 12, frond end circuitry 14, a baseband processor 16 and a post processor 18. Each antenna 12 receives a signal $r_a(t)$ transmitted over a multipath fading channel. Received signals are converted to a baseband signal r(n) by front end circuitry 14 such as one or more amplifiers, filters, mixers, digitizers, etc. The baseband processor 16 selects a desired number of signal processing delays for use in processing the baseband signal, e.g., weighting and combining various components of the baseband signal to yield soft symbol estimates or estimating received signal quality. The baseband processor 16 also provides soft bit values (sbv) to the post processor 18 for subsequent processing such as error correction.

In one embodiment, the baseband processor 16 functions as a G-RAKE receiver while in another embodiment the baseband processor 16 functions as a chip equalizer. Regardless, the signal processing delays used by the baseband processor 16 to process baseband signals are selected by a delay selection unit 20 included in or associated with the baseband processor 16. As used herein, the term signal processing delays refers to RAKE-based finger delays if the baseband processor 16 functions as a G-RAKE receiver and chip equalizer filter tap locations if the baseband processor 16 functions as a chip equalizer.

The delay selection unit 20 selects a subset of delays from a candidate set based on a delay selection metric that is periodically computed and accumulated over a period of time, e.g., over a plurality of Transmission Time Intervals (TTIs). The term "periodically" as used herein broadly refers to regular or irregular time intervals. At any particular point in time, the metric indicates which delays would be suitable for received signal processing and which ones would not. Since the metric is periodically accumulated, the decision as to which signal processing delays to select is based on both past and present metric computations. Unlike some conventional approaches, delay selection is not based solely on the metric value most recently computed at the channel fading rate.

Figure 2:
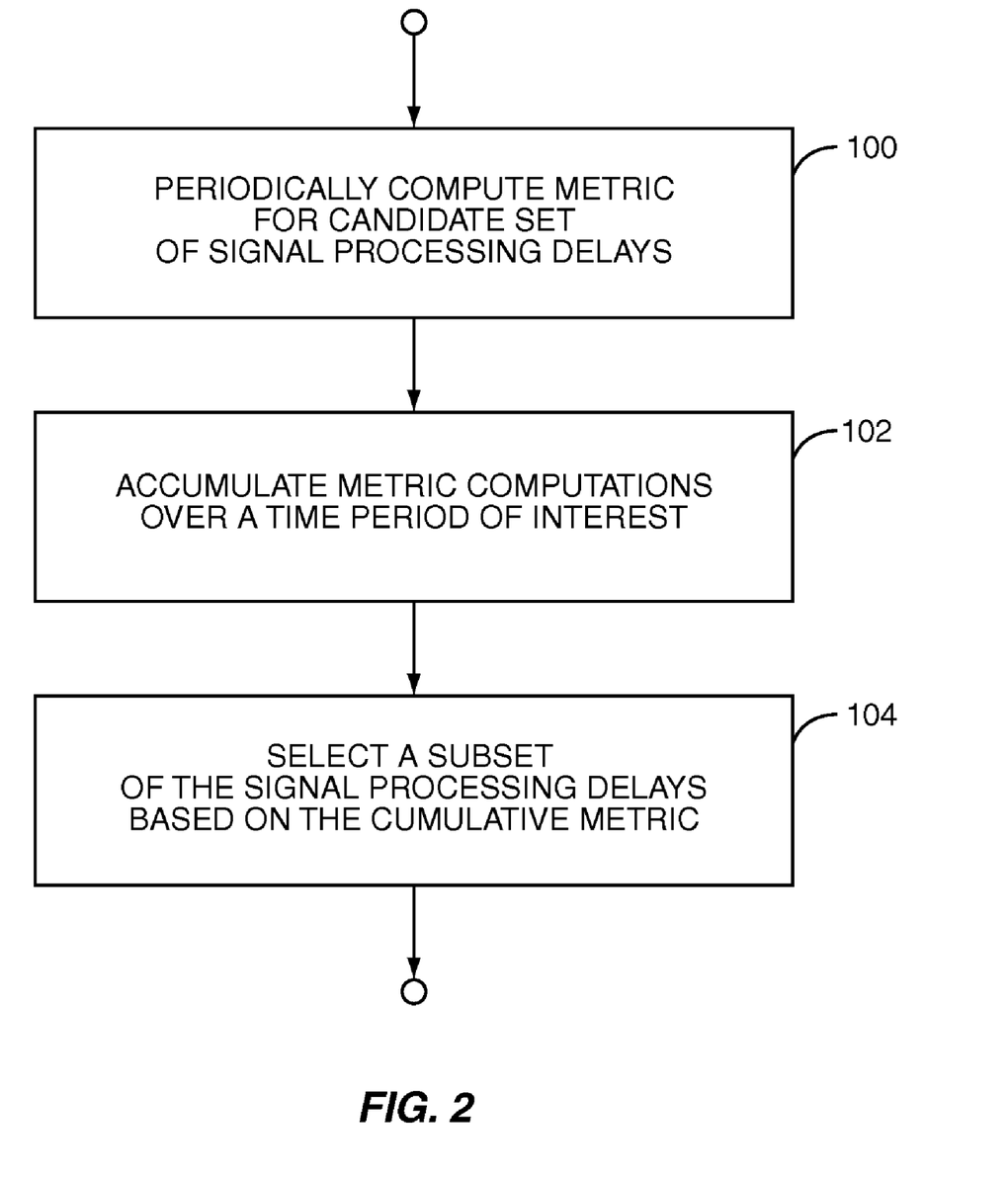
FIG. 2 illustrates one embodiment of processing logic for selecting a subset of signal processing delays from a candidate set based on a cumulative metric.

To that end, the delay selection unit 20 periodically computes a metric value for each signal processing delay or groups of delays included in a candidate set, as illustrated by Step 100 of FIG. 2. Preferably, the delay values are not altered while the delay selection process is ongoing. A metric accumulation unit 22 included in or associated with the baseband processor 16 accumulates metric computations over a period of time, as illustrated by Step 102 of FIG. 2. Metric values are accumulated by smoothing, filtering, averaging, scaling, adding, or otherwise accounting for past and present metric computations. The delay selection unit 20 selects the subset of delays from the candidate set whose cumulative metric satisfies a selection criterion, as illustrated by Step 104 of FIG. 2.

The selection criterion may be any suitable criterion for selecting a subset of signal processing delays from a candidate set. For example, the M "best" delays from a candidate set of N delays may be selected where M<N and the cumulative metric indicates which delays are "best." The metric is based on cross-correlations between different ones of the delays included in the candidate set as will be described in detail later. As such, the selection unit 20 does not choose signal processing delays based solely on power density. Alternatively, the selection criterion may correspond to a threshold.

Figure 3:
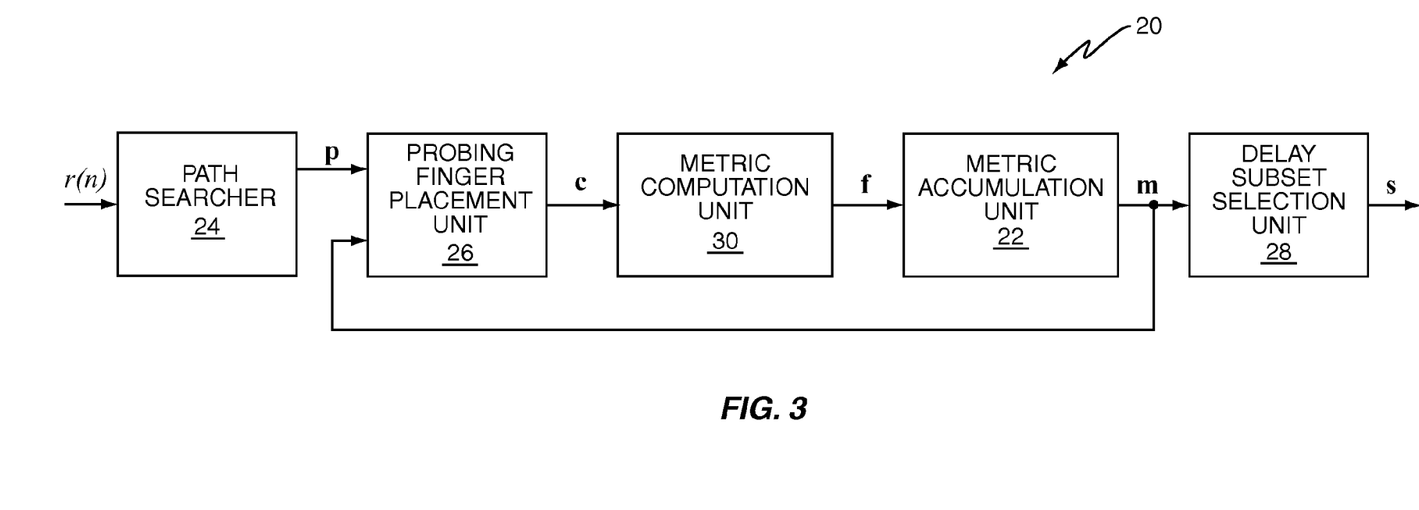
FIG. 3 is a block diagram of one embodiment of a delay selection unit for selecting a subset of signal processing delays from a candidate set based on a cumulative metric.

FIG. 3 illustrates a G-RAKE embodiment of the delay selection unit 20. According to this embodiment, a path searcher 24 determines an initial set p of signal path delays based on a baseband signal r(n) as is well known in the art, e.g., using a Power/Delay Profile (PDP) of a received signal. A probing finger placement unit 26 places probing fingers at the initial set of path delays and possibly other delays. The baseband processor 16 uses the probing fingers to characterize the wireless channel, e.g., by estimating channel response and interference correlation. The finger placement unit 26 also provides a candidate set c of delays from which a subset s is selected by a delay subset selection unit 28. The baseband processor 16 uses the selected subset of delays for received signal processing. The metric used to select the subset of delays is based on the channel response and impairment correlation estimates and is accumulated over a time period of interest.

In more detail, a metric computation unit 30 periodically calculates metric values based on cross-correlations between different ones of the candidate delays. At any particular point in time, the computed metric values indicate which delays in the candidate set c would be suitable for selection and which ones would not. However, final delay selection is not based on any single instantaneous metric calculation. Rather, periodic metric computations are accumulated over a desired time period and delay selection is based on the cumulative results.

In one embodiment, the metric indicates received signal quality. For example, the metric computation unit 30 computes a Signal-to-Interference-plus-Noise Ratio (SINR) for a group of delays included in the candidate set c as given by:

$$SINR = h^H R^{-1} h \qquad (1)$$

where h is a channel response estimate and R is a correlation matrix such as an impairment or data covariance matrix, each of which may be calculated in accordance with one of various techniques well known in the art. A related metric is a mean-square error for MMSE equalization. According to this embodiment, the signal quality-based metric indicates which signal processing delays result in the most favorable received signal quality at a particular point in time and those that do not.

Alternatively, the metric indicates the weight that would be assigned to each delay (or group of delays) if the delays were used for signal combining. For example, the metric computation unit 30 may compute combining weights such as magnitude squared values (weight powers) as given by:

$$|w_k|^2 = |(R^{-1}h)_k|^2 \qquad (2)$$

where each combining weight determines how strongly or weakly the corresponding despread signal component would be weighted if combined with other components to form an estimate of a received symbol. Various other metrics that are based on cross-correlations between different delays may be used. Regardless, each periodic metric computation is provided to the accumulation unit 22, e.g., as a vector f, the vector comprising values associated with the delays or groups of delays under consideration. The metric accumulation unit 22 collects the metric over a desired period of time, e.g., in accordance with Step 102 of FIG. 2.

In one embodiment, the metric is accumulated based on how often particular candidate delays would have been selected over a period of time. That is, each time the metric is computed, the accumulation unit 22 tracks which delays would have been selected based on the current metric and which ones would not. The results are accumulated each time a new metric computation occurs, e.g., by incrementing a cumulative count each time a corresponding delay (or group of delays) would have been selected based on the current metric computation. A histogram of cumulative count values for the delays being considered may then be analyzed to determine an optimized subset of delays, e.g., by selecting the delays that would have been selected most often over the time period of interest.

Figure 4:
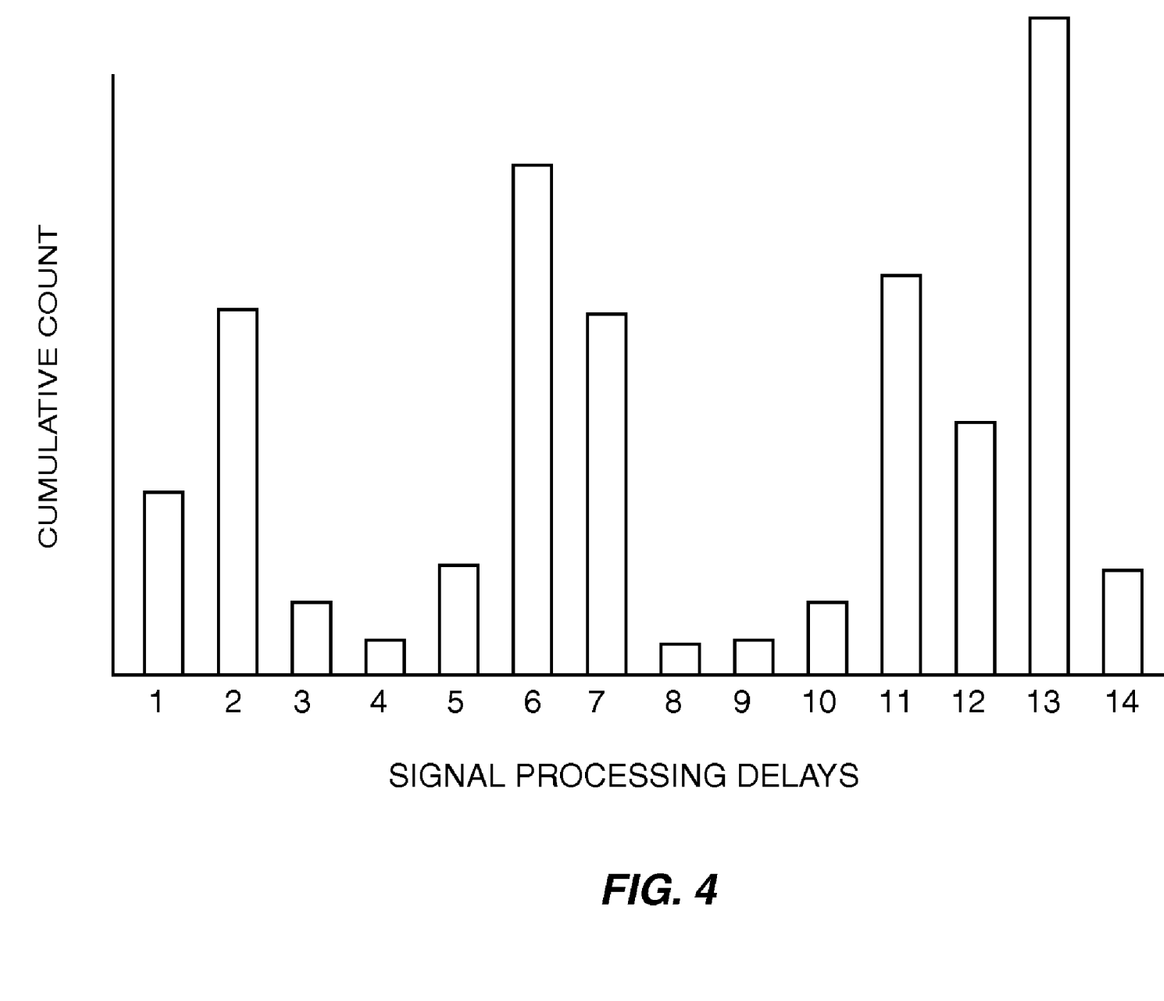
FIG. 4 is an exemplary histogram of accumulated metric computations.

FIG. 4 illustrates an exemplary distribution of cumulative count values. Cumulative results associated with fourteen signal processing delays are shown. A metric value for each delay is periodically computed and the results accumulated. After each computation, if a particular metric value indicates selection, the corresponding count is increased. Otherwise, the count is not altered. If, for example, the selection criterion is the six most frequently selected delays, then the $2^{nd}$, $6^{th}$, $7^{th}$, $11^{th}$, $12^{th}$ and $13^{th}$ delays would be selected for received signal processing. More or less delays may be selected depending upon the particular selection criterion.

In another embodiment, the metric accumulation unit 22 accumulates SINR values periodically computed in accordance with equation (1). While "accumulation" is used to illustrate one embodiment of the invention, other forms of smoothing such as exponential filtering may be used. In one example, SINR computations are accumulated by adding the most recently computed SINR value to the corresponding cumulative value as given by:

$$m_k^i = m_k^{i-1} + SINR_k \quad (3)$$

where $m_k^i$ is the new cumulative metric value at the $i^{th}$ update for the $k^{th}$ delay or group of delays, $m_k^{i-1}$ is the immediately preceding cumulative metric value, and $SINR_k$ is the most recently computed SINR metric for the $k^{th}$ delay (or group). As such, the cumulative metric indicates which delays have the largest accumulated SINR and which ones do not.

In another example, the metric accumulation unit 22 collects any type of non-linear transformation of SINR values periodically computed in accordance with equation (1). For example, periodic SINR computations may be accumulated as given by:

$$m_k^i = m_k^{i-1} + e^{-SINR_k} \quad (4)$$

Alternatively, periodic SINR computations may form the basis of Bit Error Rate (BER) estimates which are then accumulated as given by:

$$m_k^i = m_k^{i-1} + erfc(\sqrt{SINR_k}) \quad (5)$$

where erfc(x) is a well known error function used for estimating BER in CDMA systems. As such, the accumulated metric indicates which delays have the smallest accumulated BER over a period of time and which ones do not.

In yet another metric accumulation embodiment, the accumulation unit 22 collects combining weights computed in accordance with equation (2). In one example, a normalized effective combining weight is computed and accumulated for each delay or groups of delays under consideration as given by:

$$m_k^i = m_k^{i-1} + (|w_k|^2)_{norm} \quad (6)$$

where $(|w_k|^2)_{norm}$ is the normalized effective combining weight. The $k^{th}$ normalized effective combining weight is computed by dividing the squared absolute value of the combining weight associated with the $k^{th}$ delay (or group) with either the max squared absolute value of the weight between all fingers or the sum of the squared magnitude of all the weights. As such, the accumulated metric indicates the delays having the greatest accumulated effective combining weight over a period of time. Broadly, periodically computed combining weights may be raised to any sensible power.

Returning to FIG. 3, the cumulative metric is provided to the delay subset selection unit 28, e.g., as a vector m, the vector comprising cumulative metric values for the delays or groups of delays under consideration. The delay subset selection unit 28 chooses a subset s of the delays based on the cumulative metric, e.g., in accordance with Step 104 of FIG. 2. That is, the selection unit 28 chooses the delays whose cumulative metric satisfies at least one selection criterion.

In addition to selecting delays based on the cumulative metric, the cumulative metric may also be used to modify probing finger placement. That is, the cumulative metric may be fed back to the probing finger placement unit 26 as shown in FIG. 3. Alternatively, the selected subset s may be fed back to the probing finger placement unit 26. Either way, the finger placement unit 26 may use the feedback information to add, remove, or otherwise adjust probing finger placement (delays) to obtain a better understanding of the wireless channel. For example, delays not selected during the subset selection process may be excluded from the probing finger placement process. Additional probing finger delays may be added to replace removed finger delays. New finger delays may be added near those finger delays having a high likelihood of selection as indicated by the cumulative metric. For example, if the initial probing process uses a grid of equally D-spaced fingers, new fingers spaced by a distance of D or D/2 may be placed close to the fingers most often selected as indicated by the cumulative metric. Conversely, for delays that are rarely indicated as being selected, a grid with a larger spacing may be used to monitor the channel, thus conserving resources.

Figure 5:
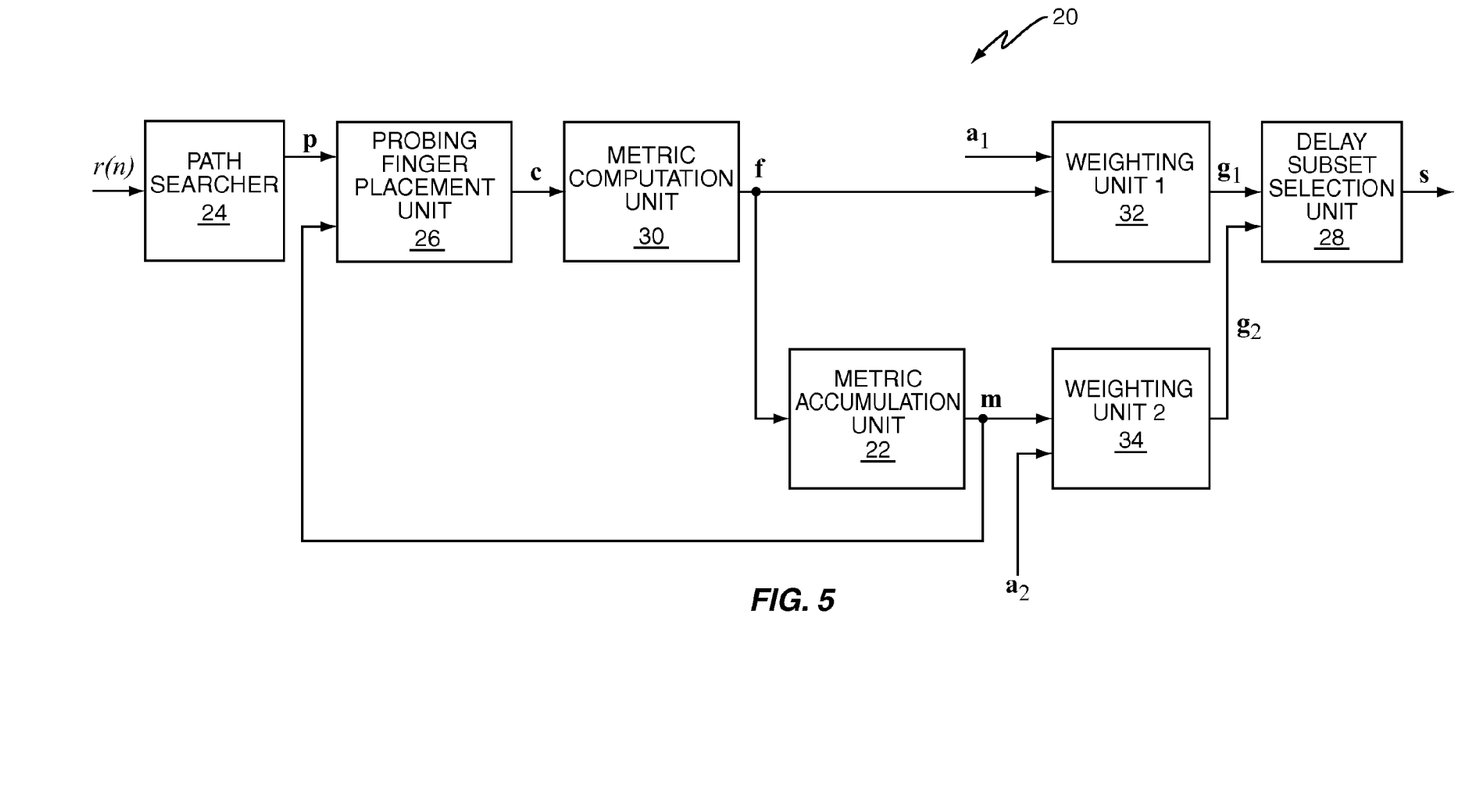
FIG. 5 is a block diagram of another embodiment of a delay selection unit for selecting a subset of signal processing delays from a candidate set based on a cumulative metric.

FIG. 5 illustrates another G-RAKE embodiment of the delay selection unit 20. According to this embodiment, the delay selection unit 20 considers both the cumulative metric and the most recently computed metric when choosing signal processing delays from a candidate set c. As such, four delay types are considered by the delay subset selection unit 28. The first delay type is optimal in that both its history and present status indicate selection. That is, both the cumulative metric and most recently computed metric indicate selection. The next kind of delay is less optimal in that either its history or present status indicates selection, but not both. That is, either the cumulative metric or the most recently computed metric indicates selection. In some situations, delays having a favorable history and unfavorable present status may be preferred over those having a favorable present status and unfavorable history. In other situations, the reverse may hold true. The last kind of delay is not of interest since neither its history nor present status indicates selection.

In more detail, the vector f of the most recently computed metric values is provided to both the metric accumulation unit 22 and a first weighting unit 32. The accumulation unit 22 accumulates metric computations over a period of time as previously described and outputs a cumulative metric vector m, where each vector value corresponds to a delay or group of delays under consideration. The first weighting unit 32 scales the vector f by a normalized weight vector $a_1$ having values that depend on how strongly (or weakly) particular metric values indicate selection, e.g., $0 \leq a_1 \leq 1$. If a particular metric value is not used in selection, its corresponding weight value is set to zero. Similarly, a second weighting unit 34 scales the cumulative metric vector m by a normalized vector $a_2$ having values that depend on how strongly (or weakly) cumulative metric values indicate selection, e.g., $0 \leq a_2 \leq 1$. The delay subset selection unit 28 determines which types of delays to select depending on the scaled metrics. For example, the scaled metrics, $g_1$ and $g_2$, can be added and used to select delays.

Figure 6:
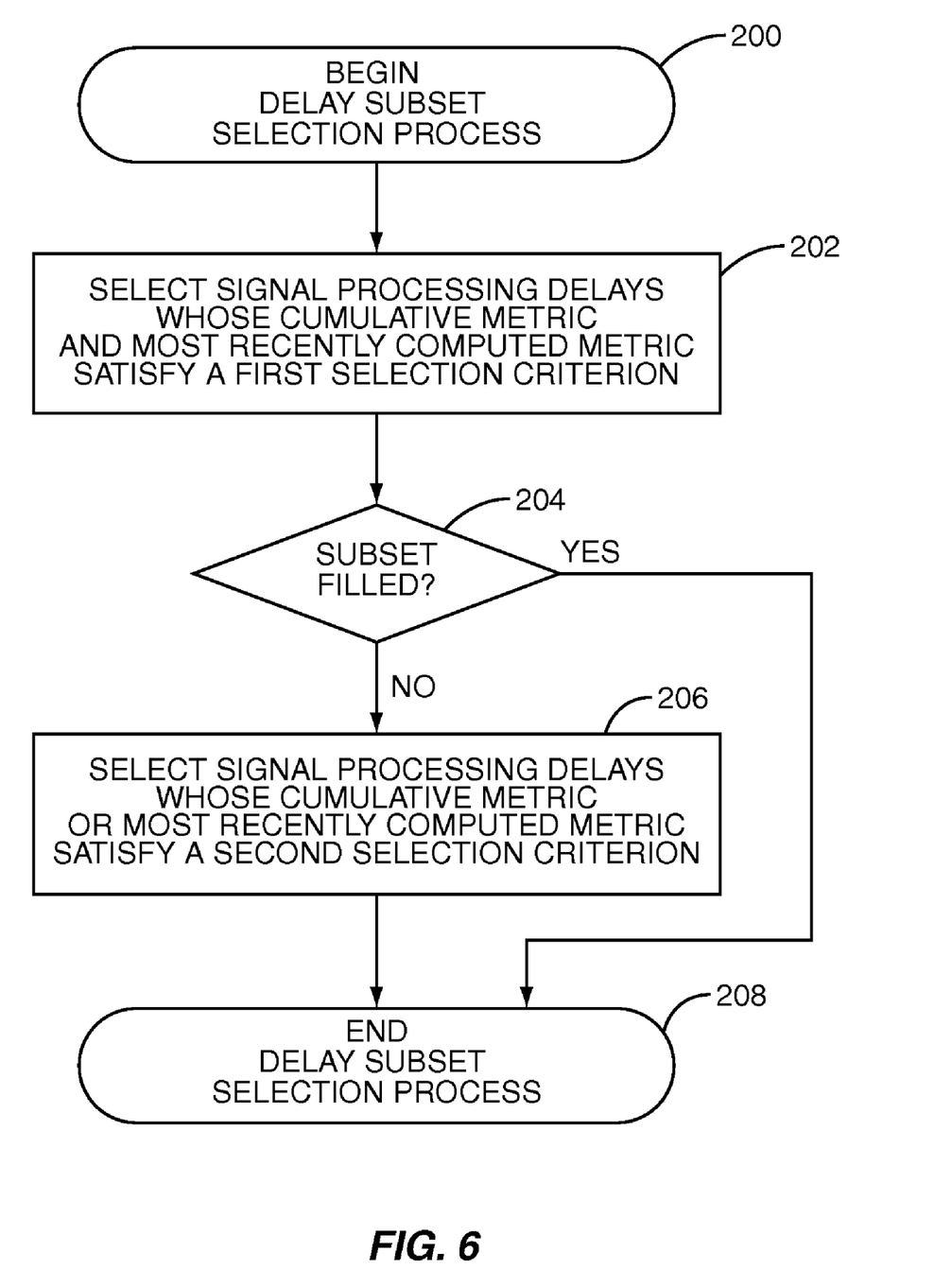
FIG. 6 illustrates another embodiment of processing logic for selecting a subset of signal processing delays from a candidate set based on a cumulative metric.

FIG. 6 illustrates an embodiment of program logic for selecting a subset of signal processing delays from a candidate set based on both the accumulated metric and the most recently computed metric. The delay selection process "begins" at Step 200. The delay selection unit 20 chooses the delays or groups of delays whose most recently computed metric and cumulative metric satisfy a first selection criterion, e.g., a criterion indicating the delays corresponding to $g_1$ and $g_2$ that are greater than zero (Step 202). These delays are considered the most optimal in that their history and most recently computed metric both indicate selection. The delay selection unit 20 then determines whether a sufficient number of delays have been selected (Step 204).

If more delays are desired, then the next best delays are selected using a second selection criterion, e.g., a criterion indicating the delays whose history or most recently computed metric indicates selection (Step 206). In one embodiment, delays having only a favorable history are selected before considering other delays (or vice-versa), e.g., the delays corresponding to the values of $g_2>0$ and $g_1=0$. Alternatively, a mixture of delays having only a favorable history or only a favorable most recently computed metric are selected, e.g., half of each type. Regardless, when the desired number of delays has been chosen, the selection process ends (Step 208).

Figure 7:
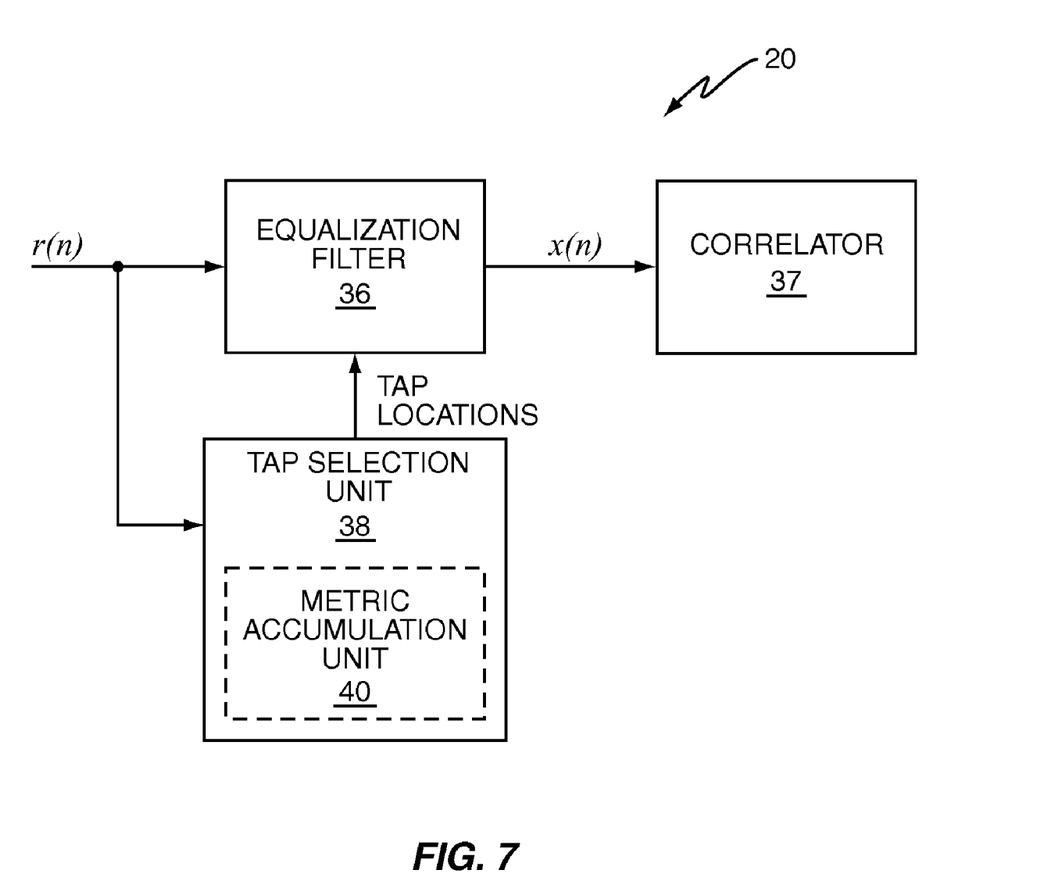
FIG. 7 is a block diagram of yet another embodiment of a delay selection unit for selecting a subset of signal processing delays from a candidate set based on a cumulative metric.

FIG. 7 illustrates a chip equalizer embodiment of the baseband processor 16. According to this embodiment, an equalization filter 36 forms chip estimates x(n) by filtering or combining baseband signals r(n). Correlator 37 forms symbol estimates by despreading the chip estimates. The baseband signals are filtered using tap locations selected by a tap selection unit 38 from a candidate set of tap locations. A metric accumulation unit 40 included in or associated with the tap selection unit 38 accumulates a metric associated with the candidate set of tap locations as previously described. The tap selection unit 38 chooses a subset of tap locations from the candidate set for use in received signal processing by the baseband processor 16.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of baseband processing in a receiver, comprising:
   accumulating a history of periodic delay selection computations at the receiver for a candidate set of signal processing delays during a time interval, the delay selection calculations based on cross-correlations between different ones of the signal processing delays; and
   at the end of the time interval, selecting a subset of the signal processing delays from the candidate set of delays for received signal processing at the receiver based on the history of delay selection computations.

2. The method of claim 1, wherein accumulating a history of periodic delay selection computations for a candidate set of signal processing delays during a time interval comprises:
   periodically computing a delay selection metric for the signal processing delays; and
   accumulating the delay selection metric during the time interval to form a cumulative metric.

3. The method of claim 2, wherein periodically computing a delay selection metric for the signal processing delays comprises:
   setting the delay selection metric to a first value for the signal processing delays that satisfy a selection criterion; and
   setting the delay selection metric to a different value for the signal processing delays that fail to satisfy the selection criterion.

4. The method of claim 3, wherein accumulating the delay selection metric during the time interval to form a cumulative metric comprises modifying the cumulative metric based on the value of the most recently computed delay selection metric.

5. The method of claim 2, wherein periodically computing a delay selection metric for the signal processing delays comprises periodically computing at least one of a signal quality based metric and a combining weight based metric.

6. The method of claim 5, wherein periodically computing a signal quality based metric comprises periodically computing one of signal-to-interference-plus noise ratios or bit error rate estimates.

7. The method of claim 2, wherein accumulating the delay selection metric during the time interval to form a cumulative metric comprises modifying the cumulative metric based on the most recently computed delay selection metric.

8. The method of claim 7, wherein modifying the cumulative metric based on the most recently computed delay selection metric comprises adding the most recently computed delay selection metric to the cumulative metric.

9. The method of claim 7, wherein modifying the cumulative metric based on the most recently computed delay selection metric comprises updating an exponential filter associated with the cumulative metric based on the most recently computed delay selection metric.

10. The method of claim 2, wherein periodically computing a delay selection metric for the signal processing delays comprises periodically computing the delay selection metric for groups of the signal processing delays.

11. The method of claim 2, wherein accumulating the delay selection metric during the time interval to form a cumulative metric comprises accumulating the delay selection metric over a plurality of transmission time intervals.

12. The method of claim 2, further comprising selecting the subset of the signal processing delays from the candidate set of delays at the receiver based on both the cumulative metric and the most recently computed delay selection metric.

13. The method of claim 12, wherein selecting the subset of the signal processing delays from the candidate set of delays based on both the cumulative metric and the most recently computed delay selection metric comprises:
   selecting the signal processing delays whose cumulative metric and most recently computed delay selection metric satisfy a first selection criterion; and
   if a desired number of signal processing delays have not been selected, selecting additional ones of the signal processing delays whose cumulative metric or most recently computed delay selection metric satisfies a second selection criterion.

14. The method of claim 1, further comprising modifying probing finger placement at the end of the time interval at the receiver based on the history of delay selection computations.

15. The method of claim 14, wherein modifying probing finger placement at the end of the time interval based on the history of delay selection computations comprises:
   removing one or more probing finger delays having a delay whose history of delay selection computations fails to satisfy a selection criterion; and
   replacing removed probing finger delays with new probing finger delays.

16. The method of claim 15, wherein replacing removed probing finger delays with new probing finger delays comprises replacing removed probing finger delays with a delay in close proximity to the signal processing delays whose history of delay selection computations indicate frequent selection.

17. The method of claim 1, wherein the signal processing delays correspond to one of RAKE-based finger delays or chip equalizer filter tap locations.

18. A wireless receiver, comprising a baseband processor configured to:
   accumulate a history of periodic delay selection computations for a candidate set of signal processing delays during a time interval, the delay selection calculations based on cross-correlations between different ones of the signal processing delays; and
   at the end of the time interval, select a subset of the signal processing delays from the candidate set of delays for received signal processing based on the history of delay selection computations.

19. The wireless receiver of claim 18, wherein the baseband processor is configured to accumulate a history of periodic delay selection computations for a candidate set of signal processing delays during a time interval by periodically computing a delay selection metric for the signal processing delays and accumulating the delay selection metric during the time interval to form a cumulative metric.

20. The wireless receiver of claim 19, wherein the baseband processor is configured to periodically compute a delay selection metric for the signal processing delays by setting the delay selection metric to a first value for the signal processing delays that satisfy a selection criterion and setting the delay selection metric to a different value for the signal processing delays that fail to satisfy the selection criterion.

21. The wireless receiver of claim 20, wherein the baseband processor is configured to accumulate the delay selection metric during the time interval to form a cumulative metric by modifying the cumulative metric based on the value of the most recently computed delay selection metric.

22. The wireless receiver of claim 19, wherein the baseband processor is configured to periodically compute a delay selection metric for the signal processing delays by periodically computing at least one of a signal quality based metric and a combining weight based metric.

23. The wireless receiver of claim 22, wherein the baseband processor is configured to periodically compute a signal quality based metric by periodically computing one of signal-to-interference-plus noise ratios or bit error rate estimates.

24. The wireless receiver of claim 19, wherein the baseband processor is configured to accumulate the delay selection metric during the time interval to form a cumulative metric by modifying the cumulative metric based on the most recently computed delay selection metric.

25. The wireless receiver of claim 24, wherein the baseband processor is configured to modify the cumulative metric based on the most recently computed delay selection metric by adding the most recently computed delay selection metric to the cumulative metric.

26. The wireless receiver of claim 24, wherein the baseband processor is configured to modify the cumulative metric based on the most recently computed delay selection metric by updating an exponential filter associated with the cumulative metric based on the most recently computed delay selection metric.

27. The wireless receiver of claim 19, wherein the baseband processor is configured to periodically compute a delay selection metric for the signal processing delays by periodically computing the delay selection metric for groups of the signal processing delays.

28. The wireless receiver of claim 19, wherein the baseband processor is configured to accumulate the delay selection metric during the time interval to form a cumulative metric by accumulating the delay selection metric over a plurality of transmission time intervals.

29. The wireless receiver of claim 19, wherein the baseband processor is further configured to select the subset of the signal processing delays from the candidate set of delays based on both the cumulative metric and the most recently computed delay selection metric.

30. The wireless receiver of claim 29, wherein the baseband processor is configured to select the subset of the signal processing delays from the candidate set of delays based on both the cumulative metric and the most recently computed delay selection metric by selecting the signal processing delays whose cumulative metric and most recently computed delay selection metric satisfy a first selection criterion and, if a desired number of signal processing delays have not been selected, selecting additional ones of the signal processing delays whose cumulative metric or most recently computed delay selection metric satisfies a second selection criterion.

31. The wireless receiver of claim 18, wherein the baseband processor is further configured to modify probing finger placement at the end of the time interval based on the history of delay selection computations.

32. The wireless receiver of claim 31, wherein the baseband processor is configured to modify probing finger placement at the end of the time interval based on the history of delay selection computations by removing one or more probing finger delays having a delay whose history of delay selection computations fails to satisfy a selection criterion and replacing removed probing finger delays with new probing finger delays.

33. The wireless receiver of claim 32, wherein the baseband processor is configured to replace removed probing finger delays with new probing finger delays by replacing removed probing finger delays with probing finger delays having a delay in close proximity to the signal processing delays whose history of delay selection computations indicate frequent selection.

34. The wireless receiver of claim 18, wherein the signal processing delays correspond to one of RAKE-based finger delays or chip equalizer filter tap locations.

35. A wireless receiver, comprising:
   a first unit configured to identify a candidate set of signal processing delays;
   a second unit configured to periodically compute a metric for the signal processing delays included in the candidate set, the metric based on cross-correlations between different ones of the signal processing delays;
   a third unit configured to accumulate the metric over a period of time to form a cumulative metric; and
   a fourth unit configured to select a subset of the signal processing delays from the candidate set of delays based on the cumulative metric.

* * * * *